United States Patent [19]

Slocum et al.

[11] Patent Number: 4,740,777
[45] Date of Patent: Apr. 26, 1988

[54] PROGRAMMABLE FLUID DETECTOR

[75] Inventors: Laurence S. Slocum; Sara M. Mussmann, both of Indianapolis, Ind.

[73] Assignee: Emhart Industries, Inc., Indianapolis, Ind.

[21] Appl. No.: 944,216

[22] Filed: Dec. 22, 1986

[51] Int. Cl.$^4$ .................. G08B 19/00; G01B 21/00
[52] U.S. Cl. ................................... 340/522; 340/603;
340/604; 340/605; 340/620; 73/40.5 R; 73/61.1 R; 324/61 P
[58] Field of Search ........ 340/522, 521, 517, 603–605,
340/620, 624; 73/40.5 R, 40, 40.7, DIG. 8, 61.1 R, 61 R; 324/61 R, 61 P, 65 R, 65 P

[56] References Cited

U.S. PATENT DOCUMENTS

| | | | |
|---|---|---|---|
| 3,882,465 | 5/1975 | Cook et al. | 340/825.07 |
| 4,586,033 | 4/1986 | Andrejasich | 340/605 |
| 4,644,354 | 2/1987 | Kidd | 340/605 |
| 4,682,157 | 7/1987 | Mussmann et al. | 340/605 |

Primary Examiner—Donnie L. Crosland
Attorney, Agent, or Firm—Carl A. Forest

[57] ABSTRACT

A plurality of probes are electrically connected to a central controller. Each of the probes is capable of providing a hydrocarbon signal, a water signal, and a dry signal to the controller upon sensing these respective environments. The controller includes an alarm transducer, relays, a keyboard, and a liquid crystal display (LCD) connected to a microprocessor and associated memories. A software program stored in memory is utilized by the microprocessor to permit users to individually select alarm conditions for each probe and relay and the latching condition for each relay which conditions are stored in memory. The probes that activate each relay may also be selected and stored. There is an RS232 port connected to the microprocessor circuit via which probe status can be requested by and communicated to a remote terminal. Upon receipt of probe signals corresponding to the selected alarm and latching conditions, the microprocessor activates the alarm and relays as programmed.

11 Claims, 3 Drawing Sheets

Microfiche Appendix Included
(1 Microfiche, 33 Pages)

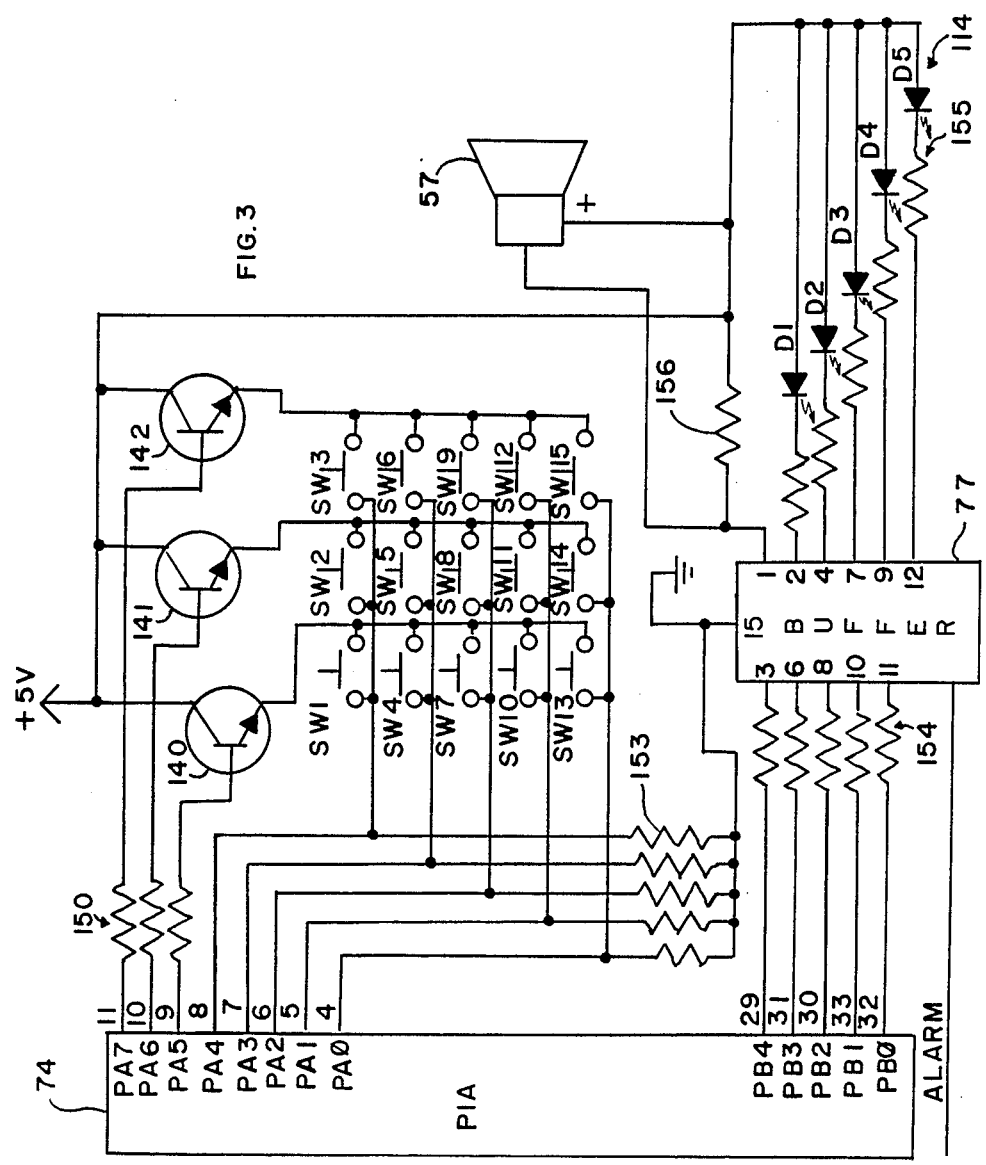

PROGRAMMABLE FLUID DETECTOR

BACKGROUND OF THE INVENTION

This patent application includes a microfiche appendix comprising the preferred software program according to the invention.

1. Field of the Invention

The present invention in general relates to programmable fluid detectors and more particularly to such detectors that can differentiate between the presence of hydrocarbons, water, and the dry condition.

2. Description of the Prior Art

The contamination of ground water by hydrocarbon leaking from underground tanks has become a serious problem in recent years, and leak detectors that can monitor the environment in the vicinity of a tank and can differentiate between hydrocarbon, water and the dry condition and provide an alarm on the detection of hydrocarbon have been developed. See, for example, U.S. Pat. No. 4,586,033 issued to Raymond J. Andrejasich. Generally, such detectors include many probes connected to a central controller. As the geophysical environments of hydrocarbon storage tanks and the nature of the failure of such tanks has become more fully understood, it has become clear that a detector that is programmable would be highly desirable. One such programmable detector is described in U.S. Pat. No. 4,644,354. That patent describes a fluid detector that includes a relay that can be programmed to be activated upon any combination of the dry, hydrocarbon or wet conditions. However, the condition to which the relay is programmed is the same for all probes connected to the system.

SUMMARY OF THE INVENTION

In this specification the term "alarm" includes both visual and auditory alerting devices. The term "remote terminal" includes both intelligent and non-intelligent electronic monitoring or reporting devices.

It is an object of the invention to provide a programmable fluid detector that permits the condition(s) under which the system will provide an alarm to be individually selected for each probe.

It is another object of the invention to provide a programmable fluid detector having a plurality of relays, for each of which the alarm condition(s) that will activate the relay and the relay latching condition can be individually selected.

It is still another object of the invention to provide one or more of the above objects in a programmable fluid detector which permits the probe(s) that activate each individual relay to be individually selected.

It is a further object of the invention to provide one or more of the above objects in a programmable fluid detector which automatically checks to assure that the selected conditions for the individual probes and relays are compatible.

It is yet a further object of the invention to provide one or more of the above objects in a programmable fluid detector which permits the probe status to be requested by and communicated to a remote terminal or control system.

It is also an object of the invention to provide one or more of the above objects in a programmable fluid detector that may be used with conventional probes.

The invention provides a fluid detector comprising: a plurality of probe means for sensing their fluid environment, each probe means including means for providing one or more of the following probe signals: a hydrocarbon signal indicative of the presence of hydrocarbon in the probe environment, a water signal indicative of the presence of water in the probe environment, and a dry signal indicative of a dry probe environment; an alarm means for providing an alarm; a selecting means for permitting the selection of an alarm condition individually for each probe from a plurality of possible alarm conditions; and activation means responsive to the probe signal and the selecting means for activating the alarm upon receiving one or more probe signals corresponding to one or more of the selected alarm conditions. Preferably the detector includes a plurality of relays and the selecting means further comprises means for permitting the selection of a latching condition individually for each relay from a plurality of possible latching conditions, and the selection of an alarm condition for each relay from a plurality of possible alarm conditions, and the activation means further comprises means responsive to the probe signals and the selecting means for latching one or more of the relays according to the selected latching condition upon receiving one or more probe signals corresponding to one or more of the selected alarm conditions. Preferably the selecting means further comprises means permitting the individual selection of the probes that will activate each of the relays. Preferably, the selecting means also includes a means for indicating the probes selected to activate each relay, the alarm conditions corresponding to each probe, and the alarm and latching conditions corresponding to each relay. Preferably the means for indicating further comprises means for indicating that the probe alarm conditions selected for an individual probe correspond to the alarm conditions selected for an individual relay. Preferably the fluid detector further comprises interrogation means for receiving a system status request from a remote terminal or control device and for communicating the status of each probe to the remote device upon receipt of a system status request.

The fluid detector according to the invention is the first fluid detector system in which both probes in wells outside of tanks and probes in between the walls of double-walled tanks can effectively be used at the same time. Moreover the system can be incorporated into existing hydrocarbon/water fluid detection systems already installed in gas stations and other locations and conventional probes already in place may be connected into the systems. Numerous other features, objects and advantages of the invention will become apparent from the following detailed description when read in conjunction with the accompanying drawings.

BRIEF DESCRIPTION OF THE DRAWINGS

In the drawings:

FIG. 3 is a detailed electrical circuit diagram of the keyboard, alarm and associated circuits according to the invention; and FIG. 4 shows the keyboard switch labeling and the locations of the keyboard LED's in the preferred embodiment of the invention.

DESCRIPTION OF THE PREFERRED EMBODIMENT

Figure 1:
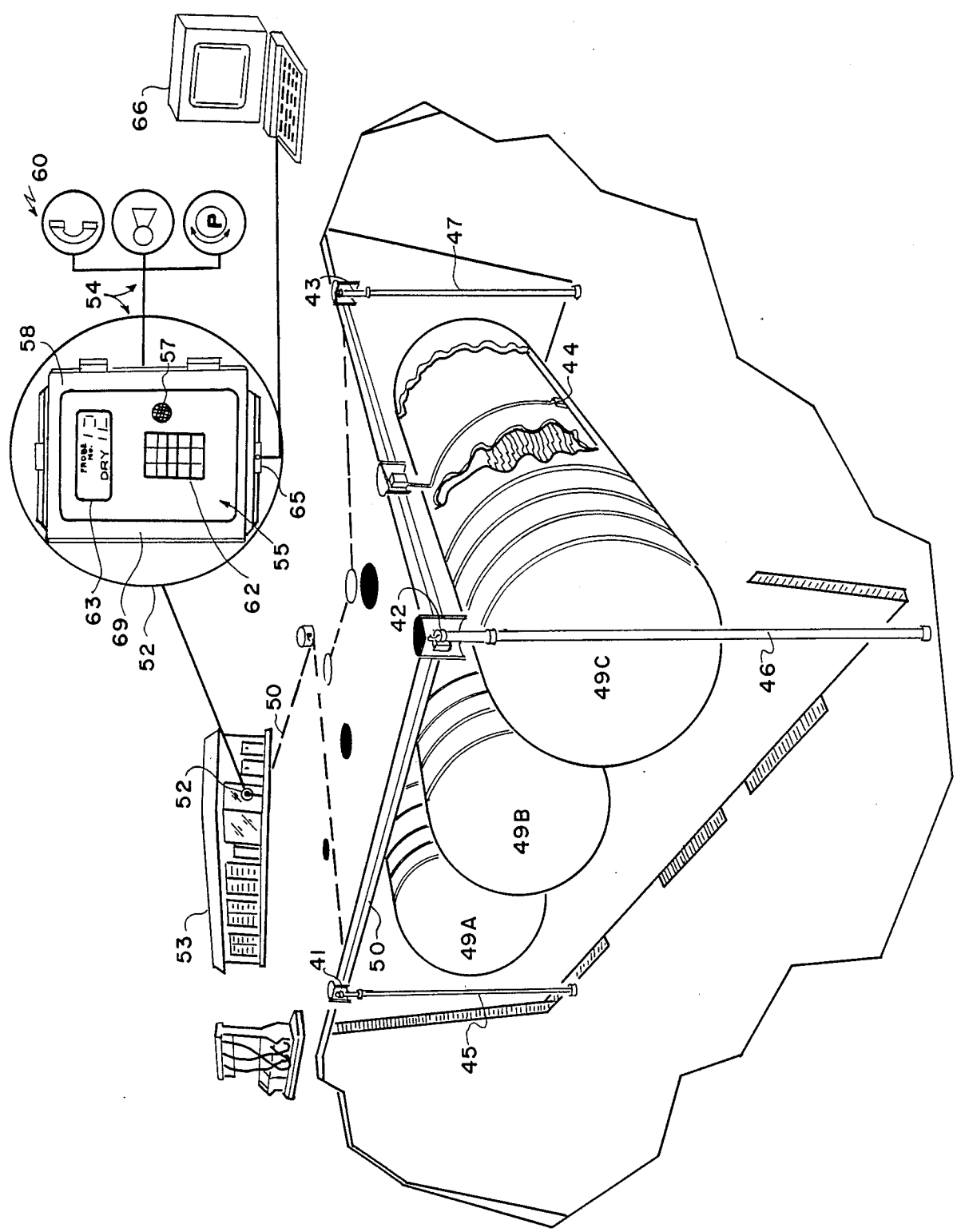
FIG. 1 is a partially cut away illustration showing a fluid detection system according to the invention installed at a gasoline station.

FIG. 1 illustrates the preferred embodiment of the invention as it may be installed at a gasoline station. A plurality of probe means 41, 42, 43 and 44 sense their environment and provide signals over cable 50 to a controller 52 which would generally be located in the service building 53. Some probes, such as 41, 42, 43 may be located in wells 45, 46 and 47 respectively, external to gasoline tanks 49A, 49B and 49C. Other probes, such as 44, may be located between the walls of a double-walled tank, such as 49C. The invention contemplates that other types of probes may also be used. Controller 52 includes an alarm means 54, a selecting means 55, and an activation means 56 (within controller 52 and shown in FIG. 2). Alarm means 54 preferably includes an alarm transducer 57 mounted on the front panel 58 of the controller, and relays 59 within the controller (FIG. 2) which may activate a variety of alarm devices 60 either in the vicinity of the station 53 or remote from the station. Selecting means 55 preferably includes a keyboard 62 and an indicating means 63 which preferably comprises a liquid crystal display (LCD) mounted on the front panel 58 of the controller 52. There is preferably also an interrogation means 65 which permits the system to communicate with a remote terminal 66.

Turning to a more detailed description of the invention, the probes 41, 42 and 43 may be probes such as described in U.S. Pat. No. 4,586,033 having a probe interface as described in U.S. Pat. No. 4,646,069 which patents are hereby incorporated by reference. Probe 44 may be a probe as described in U.S. Pat. No. 4,660,026, hereby incorporated by reference, with a probe interface as described in U.S. Pat. No. 4,646,069. Cable 50 is preferably an eight-wire shielded electrical cable. Controller 52 is preferably enclosed in a metal or plastic case 69.

Figure 2:
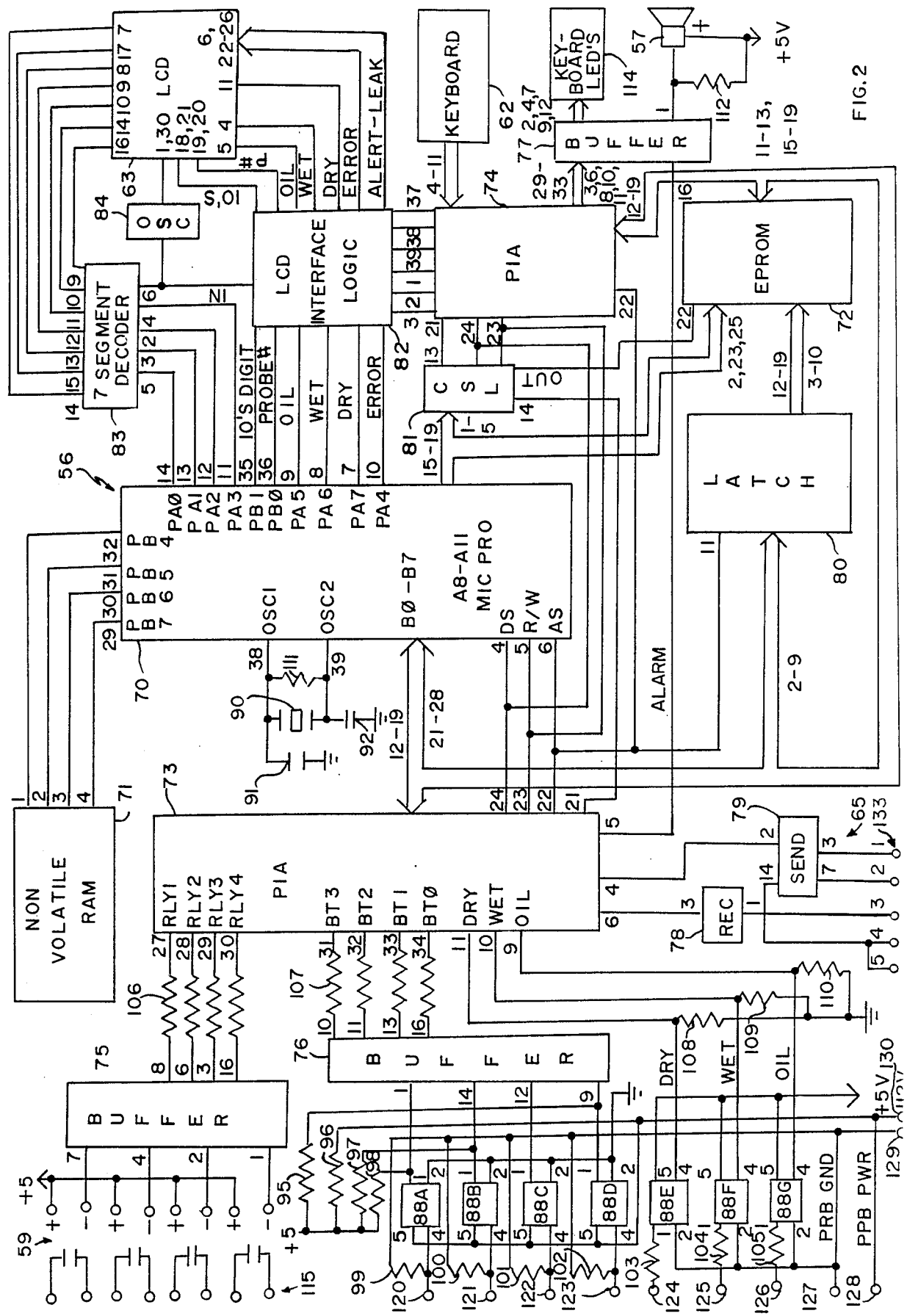
FIG. 2 is a detailed electrical circuit diagram of the preferred embodiment of the controller according to the invention.

The preferred electrical circuit enclosed in case 69 is shown in FIG. 2. The circuit includes microprocessor 70, non-volatile RAM (NOVRAM) memory 71, EPROM memory 72, peripheral interface adaptors (PIA) 73 and 74, buffers 75, 76 and 77, receiver 78, transmitter 79, latch 80, chip select logic 81, LCD interface logic 82, 4 line to 7 segment decoder 83, oscillator 84, opto-isolators 88A through 88G, crystal oscillator 90, capacitors 91 and 92, resistors 95 through 112, keyboard LED's 114, terminals 115, 120-130, and 133, and the transducer 57, relays 59, keyboard 62, and LCD 63 which were discussed with reference to FIG. 1. The numbers on the input and output lines of the various electrical components are the pin numbers of the preferred components which will be listed below. These pin numbers are placed external to the rectangles representing the devices, except in the case of the LCD 63 where they are in the interior for clarity. On the thicker connector lines which represent multiple electrical lines the pin numbers on the top of the lines are those of left-hand IC, while the pin numbers beneath the line are those of the IC on the right. The letters interiorly of the IC rectangles, such as the "PB7" near pin 29 of microprocessor 70, are the labels of the internal signal applied to the pin. In FIG. 2, power supplies and connections to the power supplies and grounds are generally not shown when they are conventional. Beginning with the mircoprocessor 70, the electrical connections are as follows. Microprocessor pin numbers 29-32 are connected to non-volatile RAM pins 4, 3, 2 and 1 respectively. Pin 38 is connected to ground through capacitor 91 and to pin 39 through crystal oscillator 90 and resistor 111 in parallel. Pin 39 is also connected to ground through capacitor 92. Pins 21 through 28 of microprocessor 70 are connected to pins 19 through 12 respectively of peripheral interface adaptor 73, to pins 9 through 2 respectively of latch 80, pins 19, 18, 17, 16, 15, 13, 12, and 11 respectively of E PROM 72 and pins 19 through 12 respectively of PIA 74. Pins 4, 5 and 6 of microprocessor 70 are connected to pins 24, 23 and 22 respectively of PIAs 73 and 74. Pin 6 of microprocessor 70 is also connected to pin 11 of latch 80 while pins 4 and 5 are also connected to chip select logic 81. Pins 15-19 of microprocessor 70 are connected to pins 4, 5, 3, 2, 1 respectively of chip select logic 81, and pins 2, 23, 21, 24 and 25 respectively of EPROM 72. Pins 9, 8, 7 and 10 of microprocessor 70 are connected through LCD interface logic 82 to pins 5, 4, 11, and 15 respectively of LCD 63. Pin 35 of microprocessor 70 is connected through LCD interface logic 82 to pins 18 and 21 of LCD 63 while pin 36 is connected through logic 82 to pins 19 and 20 of the LCD. Pins 11 through 14 of microprocessor 70 are connected to pins 4, 2, 3 and 5 respectively of decoder 83. Pins 27 through 30 of PIA 73 are connected to pins 8, 6, 3 and 16 respectively of buffer 75. Pins 7, 4, 2 and 1 of buffer 75 are connected to the negative terminal of each of the relays. The positive terminal of each relay is connected to the +5 V system power supply. Each relay has a pair of output terminals which are shown at 115. Pins 31 through 34 of PIA 73 are connected to pins 10, 11, 13 and 16 respectively of buffer 76. Pins 1, 14, 12 and 9 of buffer 76 are connected to the number 1 pin of opto-isolators 88A through 88D respectively and to the +5 V power supply through resistors 98, 97, 96 and 95 respectively. The number 2 pin of each of opto-isolators 88A through 88D is grounded. The number 5 pin of each of opto-isolators 88A through 88D is connected to the positive 12 V probe power supply. Pin 4 of opto-isolators 88A through 88D are connected to outputs 120 through 123 respectively and also are each connected to the probe ground (a floating ground independent of the other system grounds) through resistors 99 through 102 respectively. Pins 9, 10 and 11 of PIA 73 are connected to the number 4 pins of opto-isolators 88G, 88F and 88E respectively and also to ground through resistors 110, 109 and 108 respectively. The number 5 pin of each of opto-isolators 88E, 88F and 88G are connected to the +5 V power supply while pin 2 of each is connected to the probe ground. Pin 1 of opto-isolators 88E, 88F and 88G are connected to output terminals 124, 125 and 126 respectively through resistors 103, 104 and 105 respectively. Output terminal 127 is connected to the probe ground while terminal 128 is connected to the +12 V probe power supply. Pin 6 of PIA 73 is connected to pin 3 of receiver 78 and pin 1 of receiver 78 is connected to the number 3 pin of output terminal block 133. The number 4 pin of PIA 73 is connected to the number 2 pin of transmitter 79. The number 14 pin of transmitter 79 is connected to the number 4 and 5 pins of terminal block 133, while its number 7 and 3 pins are connected to the number 2 and 1 pins of terminal block 133. The number 5 pin of PIA 73 is connected to the number 16 pin of buffer 77 while the number 21 pin of PIA 73 is connected to the number 14 pin of chip select logic 81. The number 12 through 19 pins of latch 80 are connected to pins 3 through 10 of EPROM 72. The number 13 pin of chip select logic 81 is connected to the number 21 pin of PIA 74. One chip select logic output is connected to pin 22 of EPROM 72. The connections of PIA 74 to keyboard 62 and buffer 77 will be discussed in reference to FIG. 3. The output of oscillator 84 is applied to pin 6 of decoder 83, to pins 1 and 30 of LCD 63 and to the timing input of LCD interface logic 82. The number 3, 2, 1, 39, 38 and 37 pins of PIA 74 are applied to pins 6, and 22 through 26 of LCD 63 through LCD interface logic 82.

Turning now to FIG. 3, details of the keyboard 62, alarm 57, and associated circuitry are shown. This circuit comprises key switches SW1 through SW15 arranged in a 3 by 5 switch keyboard, transistors 140, 141, and 142, buffer 77, transducer 57, LED's 114 (D1 through D5) and resistors 150 through 156. One side of each of switches SW1, SW2, and SW3 is connected to pin 8 of PIA 74. Similarly one side of switches SW4, SW5 and SW6, SW7, SW8 and SW9, SW10, SW11 and SW12 and SW13, SW14 and SW15 are connected to pins 7, 6, 5, and 4 respectively of PIA 74. Each of pins 4 through 8 of PIA 74 is also connected to ground through one of resistors 153. The other side of each of switches SW1, SW4, SW7, SW10 and SW13 is connected to the emitter of transistor 140. Likewise the other side of switches SW2, SW5, SW8, SW11 and SW14 and SW3, SW6, SW7, SW12 and SW15 are connected to the emitters of transistors 141 and 142 respectively. The collectors of transistors 140, 141 and 142 are connected to the +5 V power supply. The bases of transistors 140, 141, and 142 are connected to pins 9, 10, and 11 respectively of PIA 74 through one of resistors 150. Pins 3, 6, 8, 10 and 11 of buffer 77 are connected to pins 29, 31, 30, 33, 32 respectively of PIA 74 through one of resistors 154. Pins 2, 4, 7, 9, and 12 of buffer 77 are connected to the cathodes of diodes D1 through D5 respectively through one of resistors 155. The anodes of the diodes are connected to the +5 V power supply. Pin 1 of buffer 77 is connected to the negative terminal of transducer 57, and to the +5 V power supply through resistor 156. The positive terminal of transducer 57 is connected to the +5 V power supply. Pin 15 of buffer 77 is connected to ground. The LED's D1 through D5 are positioned under switches SW14, SW10, SW11, SW8 and SW9 respectively as indicated in FIG. 4. Each of switches SW1 through SW15 is labelled as indicated under the switch number in FIG. 4.

The preferred electronic components are as follows: Microprocessor 70 is a Motorola MC146805E2 with an internal RAM; PIAs 73 and 74 are type MC146823; non-volatile RAM (NOVRAM) 71 is a type X2444 EEPROM; EPROM 72 is a type 2764; buffers 75, 76, and 77 are type CA3081 transistor arrays; receiver 78 is a type DS1489; transmitter 79 is a type DS1488 and has its own ±12 V power supply which is not shown; latch 80 is a type 74HC573; chip select logic 81 is composed of a type 74LS138 8-bit latch, a Quad 2-input NOR package type 4001, a dual 4-input NAND package type 4002, a Quad 2-input NAND package type 4011, and one inverter from a type 4069BE inverter package; the numbered pins shown in FIG. 2 for the chip select logic are those for the type 74LS138 latch; the logic gates of CSL 81 are connected to decode the address A8-A11 output by the microprocessor to select which of chips 72, 73 and 74 to turn on to receive or send data as determined by the address; LCD interface logic 82 is composed of 3 Quad 2-input Exclusive-OR packages type 4030 which are connected so as to provide the proper signals on the LCD inputs to turn on the LCD segments to display the words and numbers shown on the input and output lines; decoder 83 is a type 4543 4-line to 7-segment decoder-driver for the LCD display; oscillator 84 is a square wave driver to provide the back plane signal to the LCD 63; LCD 63 is a custom LCD which will display the words "oil", "wet", "dry", "error", "alert", "leak", and "probe No." and the numbers 1 through 15; keyboard 62 is composed of two 6 key pads and one 3 key pad connected as shown; transducer 57 is a SONALERT TM brand audio alarm module available from Mallory Components Group, P. O. Box 706, Indianapolis, Ind. 46206; opto-isolators 88A through 88G are type T1L116; relays 59 are optically isolated triacs; crystal oscillator 90 is a 4 MHZ oscillator, capacitors 91 and 92 are 27 picofarad; transistors 140, 141, and 142 are type 2N4124; resistors 95 through 98 are 390 ohms, resistors 99 through 102, 106, 107, 150, 154 and 156 are 10K ohm, resistors 103, 104 and 105 are 3K ohm, resistor 111 is 10 megohm, resistors 108 through 110 and resistors 153 are 100K ohm, and resistors 155 are 270 ohm; terminal block 133 is an RS232 connector.

The software program which operates the system and which is stored in EPROM 72 may be preferably described as follows (with the routine names referred to within the program given in parenthesis before the first line of each routine):

(INIT)

Set all port pins to initial states
Clear MPU RAM
Read data from NOVRAM into MPU RAM (restores probe & relay program information)
Initialize timers
Restore LED's to status just before power off
Initialize LCD display (MONITOR)

(Executive routine which calls the main operating routines)
Do "GETPRB" (read data from next probe)
Do "ERRCHK" (check probe data for invalid states)
Do "ALRMCK" (check probe data for alarm conditions)
Do "CHKALER" (update warning indicators according to any probe alarm or error)
Do "CHKRLY" (update relay outputs according to any probe alarm)
Do "KEYPRC" (process any valid key inputs and execute related command)
Do "CHKRX" (process data in serial receive buffer (if any))
If 6 seconds has not elapsed since last probe was input, loop back to the "KEYPRC" routine
Else continue
Restart 6 second timer
If stop scan flag is set, loop back to the "KEYPRC" routine
Else continue
Go to top of this routine (GETPRB)

Update current probe pointer
If no alarms programmed for current probe, exit
Else continue
Display current probe number
Output address or current probe on probe bus
Start delay timer (delay until probe returns data)
During delay time, check for key input If key hit, go process it ("KEYPRC") and when done, reset probe pointer to #1 and jump to top of this routine
Else continue
If delay not done, loop to check for key input again
Else continue
Read probe data from probe bus
Store probe data in probe data array
Update display with new probe data (ERRCHK)

If current probe has no alarms programmed, exit
Else continue
Check current probe data for invalid states (i.e. DRY & WET)
If no invalid states found, clear error flag for current probe and exit
Else set error flag for current probe and exit (ALRMCK)

Compare current probe's data to its alarm program
If no match found, exit
Else continue
If error flag already set for current probe, exit
Else continue
If alarm match is "OIL", set alarm flag for current probe and display "LEAK", then exit
Else alarm match is "DRY" or "WET" so set alert flag for current probe and display "ALERT", then exit (CHKRX)

If no message received by serial port is in buffer, exit
Else if parity error flag set during reception of message, exit
Else if message format is incorrect, ignore message and exit
Else clear message received flag and do "TXPROB" routine to transmit current status of all probes on serial port (TXPROB)

Set current probe pointer to probe #1
Load ASCII text data and current probe data into transmit buffer
Enable transmission of data via interrupt routine
Loop here until all data has been transmitted
Update current probe pointer
If current probe not past last probe, go to 2nd line of this routine
Else exit (KEYPRC)

(Check for key input and execute related command if key input found)
If "ALARM CHECK" key hit,
  Save status of display, LED'S, and alarm transducer
  Turn on all LCD segments, LED'S and alarm transducer for 2 seconds
  Restore display, LED'S and alarm transducer to previous state
  Exit
If "AUD. ALARM" key hit,
  Toggle alarm transducer disable flag
  Toggle LED behind "AUD. ALARM" key
  Update NOVRAM EEPROM to reflect the new state of this flag
  Exit
If "STOP SCAN" key hit,
  Toggle "STOP SCAN" flag
  Toggle LED behind "STOP SCAN" key
  Update NOVRAM EEPROM to reflect the new state of this flag
  Exit
If "PROBE" key hit,
  Clear display
  Reset current probe pointer
  If current probe has any alarm program, display it along with current probe #, and wait for 6 seconds, then continue
  Else increment probe pointer and go to the start of this statement
  Increment probe pointer
  If pointer not past last probe, go to 3rd line of this key routine
  Else exit
If "RELAY" key hit,
  Clear display
  Display program for relay #1 for 6 seconds
  Reset current probe pointer
  If current probe is programmed to activate current relay, display probe number and program for 6 seconds
  Else continue
  Increment probe pointer
  If pointer not past last probe, go to 4th line of this key routine
  Else continue
  Repeat all the above for relays 2, 3, and 4, and then exit
If "EXIT" key hit, then "N.O." key hit, then "DRY" key hit (in that order),
  Then look for next key
  If "PROG" key hit, jump to "PROG" routine
  Else if "N.C." key hit, jump to NOVRAM erase routine
  Else if "EXIT" key hit, return to "MONITR" routine
  Else if 6 seconds go by without a key hit, return to "MONITR" routine
If "ERROR CHECK" key hit,
  Clear Display
  Reset current probe pointer
  If current probe has a current alarm condition, display probe number and probe status
  Else continue
  Increment probe pointer
  If pointer not past last probe, go to 3rd statement of this key routine
  Else continue
  Reset current probe pointer
  If current probe has an error condition, display probe number and probe status
  Else continue
  Increment probe pointer
  If pointer not past last probe, go to 9th statement in this key routine
  Else exit (PROG)

Clear display
Look for next key
If "PROBE" key hit, jump to "PROBE" routine (program probes)
If "RELAY" key hit, jump to "RELAY" routine (program relays)

If "ENTER" key hit, jump to "TXPROB" routine (send probe status over serial port)
If "TEST" key hit, jump to "DIAGNS" routine (run diagnostic test)
If "EXIT" key hit, return to "MONITR" routine
Else if no key hit within 6 second, return to "MONITR" routine (RELAY)

Starting with relay 1,
   Program relay type (N.O. or N.C.)
   Program alarm states (DRY, WET, OIL)
   Assign probes that will control this relay when an alarm occurs
Repeat the above for relays 2, 3, and 4

(PROBE)

Reset current probe pointer
Display current probe number
Display current probe programmed alarm states
Allow operator to alter alarm programming via key input
When done, increment probe pointer
If all probes not done, go to 2nd statement in this key routine
Else continue
Check all probe and relay programs and remove probes from the relay assignments if their alarm program no longer matches that of the relay it was assigned to
Exit (CHKALER)

Check all probe status indications
If any probe has an alarm and/or error condition flagged, display the appropriate indicators and activate the alarm transducer
Else clear all error and alarm indicators and alarm transducer
Exit (CHKRLY)

Check all probe status indicators
If any probe has an alarm condition, then check relay programs, continue
Else exit
If relay programs have alarming probe assigned to them, control relay according to relay program
Else exit (DIAGNS)

Turn on LED behind the "TEST" key
Turn on all display segments
Clear all port pins
Wait until "EXIT" or "PROG" keys are hit
If "EXIT" hit, jump to "INIT" routine to restart program
If "PROG" hit, continue
Clear display
Cycle thru each display segment individually as "PROG" key is hit
Cycle thru the lighting of each LED
Toggle alarm transducer
Toggle serial output port, then read and display level on serial input port so that serial I/D can be checked by connecting them together for diagnostic routine
Toggle each relay
Cycle thru all probes, displaying probe number and current probe data Enter keyboard test, which displays a numeric code for each individual key on the keypad. To exit this test, push 2 keys at the same time
Jump to "INIT" routine to restart program The software also contains routines for controlling the reading, writing, enabling, disabling, and transfer of data from NOVRAM 71 to microprocessor RAM and RAM to NOVRAM, the updating of the timer control register, the updating of the timers, the control of serial date reception and transmission, the control of the transducer's on, off and pulse states, the control of the pulsing LCD indicators, and the control of hypod scanning and debouncing. The preferred embodiment of the software according to the invention is given in a microfiche appendix.

The electronic design of the fluid detector according to the invention is selected to provide maximum protection from false alarms due to extraneous inputs. This is obtained by the selection of CMOS low-power components, opto-isolators, buffered interfaces, and ground loop de-coupling capacitors between power and ground on all devices. Additional fault-avoidance features are provided in software, via debounce coding and sensor diagnostics.

In the preferred embodiment up to fifteen probes may be connected to the probe terminals 120 through 128 via an eight wire cable, although the invention is not limited to that number. RS232 communication port 133 allows the detector to be hard-wired to a remote printer, terminal, computer or modem. The four relay terminals 115 may be connected to any number of devices, such as a remote audible alarm, a telephone dialer, a pump or other motor etc. As indicated above, the various chips and circuits are connected to power sources and other electronics to provide power, orderly start-up etc. as described in the instructions that are provided by their manufacturers.

The system operates as follows. Upon start-up, the port pins are set to their initial states, the memory in microprocessor 70 is cleared and the data is read from the NOVRAM memory 71 into the microprocessor memory. Using this data, the microprocessor initializes the timers and LCD and restores the system to the status prior to power off. The system then goes into the monitor routine. The first probe number in digital format is placed on pins 31, 32, 33 and 34 of PIA 73, which causes the probe to respond with its status on inputs 124, 125 and 126 which causes corresponding status signals to be placed on pins 10, 9, and 11 respectively of PIA 73, which signals are read into memory. Similarly, each probe is read in sequence, the data is checked for invalid states, then compared to the probe's selected alarm condition. If one or more alarm conditions are met the proper LEAK or ALERT descriptor on the LCD display 63 will pulsate on and off, depending on the alarm state. This will be accompanied by a continuous audible alarm on transducer 57. For a primary alarm state (OIL), the LEAK descriptor will pulsate, while the audible alarm gives a continuous tone. For a secondary alarm state (WET or DRY), the ALERT descriptor will pulsate, while the audible alarm gives a continuous tone. The system also monitors each probe for functionality. If a probe should become disabled, or its instrumentation wiring severed, the ERROR descriptor will be enabled and a pulsating audible alarm activated.

If a primary alarm state (OIL) and a secondary alarm state (WET or DRY) exist simultaneously, the primary alarm state has priority and the LEAK descriptor will pulsate accompanied by a continuous audible alarm. Likewise, the primary and secondary alarm states both have priority over the ERROR state.

To determine which probe(s) are alarming, the ERROR key is depressed. This will silence the audible alarm 57. The flashing LEAK or ALERT descriptor will stay on continuously and the PROBE NO. descriptor will cycle and display the alarming probes at six second intervals. At each probe number displayed, the proper OIL, WET or DRY alarm descriptor will be displayed, along with respective LEAK or ALERT descriptor. To freeze the cycling mode for any probe number, the STOP SCAN key is pressed. An LED in the keypad will illuminate to indicate the system is in the STOP SCAN mode. Depressing the key a second time will return the system to the scan mode. When all the alarming probes have been scanned, the system will return to the normal monitoring mode unless the ERROR descriptor is also enabled indicating a system problem. If so, the controller will first cycle the probes displaying failure conditions before returning to the normal monitoring mode.

Similarly, if the ERROR descriptor is pulsating, the probe(s) that are in an invalid condition may be determined by depressing the ERROR key. The system will first cycle any probe numbers that are in an alarm mode. This will then be followed by a cycling of probe numbers in error (invalid condition). If there are no alarming probes, the system will immediately go into the routine for cycling the probe(s) that are giving the error conditions. During the cycling period, the ERROR descriptor will be on, and the PROBE NO. descriptor will identify the probes with the invalid states (i.e., indication of multiple states, or no state). The OIL, WET and DRY descriptors will be enabled accordingly for each probe identified. Again, to freeze the cycling mode for any probe number the STOP SCAN key is depressed. An LED in the keypad will illuminate to indicate the mode that is enabled. A second push of the key will extinguish the LED and return the system to the scan mode. When all the probes with invalid conditions have been identified, the system will return to the monitor mode.

After the warning indicators and alarms are set by the system, the selected relay alarm conditions are checked and if a particular probe that is selected for that relay is alarming the relay is set as prdgrammed.

If it is desired to program the system, a security code consisting of three keys pressed in order (in the embodiment described, these are EXIT, N.O. and DRY) is entered on the keypad then the PROG key is pressed. The system then enters the program mode the next time it checks the key inputs (which occurs several times in the monitoring loop and also in the data reading (Get Prob) routine). In the program mode, pressing the PROBE key will cause the system to enter the probe programming mode. Probe No. 1 is displayed on the LCD 63, whereupon the alarm condition keys (DRY, OIL, WET) may be pressed to select any combination of conditions desired. The conditions selected are displayed on the LCD 63. The ENTER key is the pushed and the selected conditions are stored in the microprocessor memory. The system then sequences to the next probe number. When all probes have been programmed, the system checks the selected conditions against the conditions the relays are set to and removes the probes from their assignments to a relay if the selected conditions do not match those of the relay. Similarly, the relays may be programmed when the RELAY key is pressed in the program mode. The first relay number will appear on the LCD and the relay latching condition may be selected to be normally open (N.O.) or normally closed (N.C.) by pressing the appropriate key. The LED, D4 or D5, under the respective N.O. or N.C. key will illuminate to indicate the condition selected. The relay alarm conditions may be selected, again as any combination of OIL, WET, or DRY, by pressing the appropriate key. The selected conditions will be displayed. The ENTER key is then pushed to store the relay latching and alarm conditions. The probe numbers that are programmed to the same conditions will then cycle on the LCD display. If the PROG key is pressed while a probe number is displayed, that probe will be assigned to the relay. If a probe has been selected to activate a relay, the probe alarm state descriptor on the display 63 that corresponds to the selected relay alarm condition will flash. If a probe has been previously programmed to alarm, or mistakenly programmed to alarm, the probe can be removed from those selected by pressing the PROG key when the probe number is displayed. If the ENTER key is then pressed again, the probes selected will be stored in the microprocessor memory and the system cycles to the next relay.

If the ENTER key is pressed after the security code and PROG keys have been pressed, then the probe status will be transmitted via the RS-232 port. The EXIT key may be used to exit from the programming or test mode to the monitor mode. Pressing the ALARM CHECK key will test the functionality of all audible and visual components. The audible alarm 57 will sound, the entire LCD display 63 will be activated, and the five keypads indicated in FIG. 4 will be illuminated. The AUD ALARM key disables the alarm 57 when depressed once and reinstates it if depressed a second time. LED D1 illuminates under the key when the alarm 57 is disabled. Depressing the ERROR key will sequence the alarming probes, showing probe number, alarm descriptor, and programmed alarm state. After the alarming probes are sequenced, the system will sequence failed probes showing probe number, error descriptor, and cause of alarm, e.g., two states indicated (oil and water) or no states. When the PROBE key is pressed in monitor mode, the display will cycle a review of the selected alarm conditions of each probe. Similarly, pushing the RELAY button will cycle the programmed relay states. When the relay programmed states are reviewed as above, the LED inside the N.O. and N.C. buttons illuminate to indicate the selected latching conditions. Pressing the TEST key after the security code is entered and the PROG key is pressed will cause the self-diagnostic routine (DIAGNS) described above to be performed. During this routine, the LED D2 beneath the TEST button, SW10 will illuminate. Pressing the STOP SCAN button in the monitoring mode will freeze the cycling of the probes. The LED D3 beneath the STOP SCAN button will illuminate. A second push of the button will return the system to the normal scan mode.

The system includes a time out feature. If the system is left in the program mode for more than six minutes without the ENTER key being pressed at least once to enter data, the system will automatically go back to monitor mode.

In monitor mode the software regularly directs the system to check the serial data receive buffer 78 for a signal. If a message has been received, the message is checked for correct parity and proper format and if both are satisfactory, the system transmits the current status of the probes and as if the ENTER key had been pressed immediately after the security code and PROG keys have been pressed.

It is a feature of the invention that both probes in wells outside of tanks and probes placed between the walls of double-walled tanks may be effectively monitored at the same time. For the probe numbers for the outside of tank probes generally the "oil" alarm condition alone would be selected. For the between the wall probes, both "oil" and "water" alarm conditions would be selected. In this case, the "oil" alarm would indicate a leak in the inner tank and a "water" alarm would indicate a leak in the outer tank. Further, in some locations ground water may exist normally at one external probe but not at another and the probe alarms conditions may be set accordingly.

A novel fluid detector has been described. It is evident that those skilled in the art may now make many uses and modifications of the specific embodiment described, without departing from the inventive concepts. For example, other equivalent electronic parts may be used. Consequently, the invention is to be construed as embracing each and every novel feature and novel combination of features present in the fluid detector described.

What is claimed is:

1. A fluid detector comprising:
   a plurality of probe means for sensing their fluid environment, each probe means including means for providing one or more of the following probe signals: a hydrocarbon signal indicative of the presence of hydrocarbon in the probe environment, a water signal indicative of the presence of water in the probe environment, and a dry signal indicative of a dry probe environment;
   alarm means for providing an alarm;
   storage means for storing alarm conditions;
   selecting means for permitting an operator to select one or more alarm conditions individually for each probe from a plurality of possible alarm conditions and to store said conditions in said means for storing; and
   activation means responsive to said probe signals and communicating with said means for storing for activating said alarm upon receiving one or more probe signals corresponding to one or more of the stored alarm conditions.

2. A fluid detector as in claim 1 wherein said alarm means further comprises a plurality of relays, said means for storing further comprises means for storing latching conditions, and wherein said selecting means further comprises means for permitting an operator to select a latching condition individually for each relay from a plurality of possible latching conditions, to select one or more alarm conditions for each relay from a plurality of possible alarm conditions, and to store said conditions in said means for storing; and
   said activation means further comprises means responsive to said probe signals and communicating with said means for storing for latching one or more of said relays according to said selected latching conditions upon receiving one or more probe signals corresponding to one or more of said stored conditions.

3. A fluid detector as in claim 2 wherein said selecting means further comprises means for permitting an operator to individually select the probes that will activate each of said relays.

4. A fluid detector as in claim 3 wherein said selecting means further includes means for assuring that one or more alarm conditions selected for each probe are compatible with the one or more alarm conditions selected for the one or more relays to which the probe is assigned.

5. A fluid detector as in claim 3 wherein said means for selecting includes indicating means for indicating the probes selected to activate each relay.

6. A fluid detector as in claim 5 wherein said indicating means further comprises means for indicating the alarm conditions corresponding to each probe.

7. A fluid detector as in claim 6 wherein said indicating means further comprises means for indicating that the probe alarm condition selected for an individual probe corresponds to the alarm condition selected for an individual relay.

8. A fluid detector as in claim 7 wherein said indicating means comprises:
   a display;
   means for displaying on said display a number corresponding to the selected probe, a number corresponding to the selected relay, and the probe alarm conditions selected; and
   means for causing the probe alarm condition display corresponding to the selected relay to flash.

9. A fluid detector as in claim 1 and further comprising interrogation means for receiving a system status request from a remote control device and for communicating the status of each individual probe to said remote device upon receipt of a system status request.

10. A fluid detector as in claim 1 wherein said possible alarm conditions comprise any combination of hydrocarbon, water, or dry.

11. A fluid detector as in claim 2 wherein said possible latching conditions comprise normally open and normally closed.

* * * * *